United States Patent
Romanin

(10) Patent No.: US 7,575,633 B2
(45) Date of Patent: Aug. 18, 2009

(54) FLUID DISPENSER WITH POSITIVE DISPLACEMENT PUMP

(75) Inventor: Mario Romanin, Valley City, OH (US)

(73) Assignee: Nordson Corporation, Westlake, OH (US)

( * ) Notice: Subject to any disclaimer, the term of this patent is extended or adjusted under 35 U.S.C. 154(b) by 225 days.

(21) Appl. No.: 11/130,865

(22) Filed: May 17, 2005

(65) Prior Publication Data

US 2006/0263513 A1 Nov. 23, 2006

(51) Int. Cl.
*B05C 1/06* (2006.01)

(52) U.S. Cl. ............ 118/257; 118/663; 118/683; 118/692; 118/696; 118/712; 118/106; 118/264; 118/304

(58) Field of Classification Search .......... 118/663, 118/683, 692, 696, 712, 106, 257, 264, 304; 15/103, 250.001, 256.5, 97.1, 102; 222/187, 222/504; 427/429; 399/325
See application file for complete search history.

(56) References Cited

U.S. PATENT DOCUMENTS

| | | | | |
|---|---|---|---|---|
| 3,739,717 A | * | 6/1973 | Brown et al. | 101/37 |
| 4,751,548 A | * | 6/1988 | Lawson | 399/325 |
| 4,949,096 A | * | 8/1990 | Ogawa et al. | 346/25 |
| 5,022,556 A | * | 6/1991 | Dency et al. | 222/1 |
| 5,277,927 A | | 1/1994 | Burns et al. | |
| 5,370,905 A | | 12/1994 | Varga et al. | |
| RE35,010 E | | 8/1995 | Price | |
| 5,906,682 A | | 5/1999 | Bouras et al. | |
| 5,927,560 A | | 7/1999 | Lewis et al. | |
| 6,471,774 B1 | * | 10/2002 | Krueger | 118/264 |
| 6,630,028 B2 | * | 10/2003 | Briese et al. | 118/683 |
| 6,695,917 B2 | | 2/2004 | Wright et al. | |
| 2004/0047995 A1 | | 3/2004 | Krueger | |

FOREIGN PATENT DOCUMENTS

| | | |
|---|---|---|
| CH | 528 926 | 10/1972 |
| EP | 1475491 | 11/2004 |
| JP | 2000160109 | 6/2000 |

* cited by examiner

*Primary Examiner*—Laura Edwards
(74) *Attorney, Agent, or Firm*—Calfee, Halter & Griswold LLP

(57) ABSTRACT

Fluid dispensing apparatus uses positive displacement of the fluid for accurate metering of the quantity of liquid applied to a surface. Positive displacement includes a metering volume that is filled and emptied so that each cycle corresponds to an accurate volume of material dispensed independent of viscosity. In one embodiment, a positive displacement pump is used with a variable speed air motor. The air motor drives the pump. A variable output air regulator supplies air pressure to run the air motor based on a position signal. A profile may be used to relate position with motor speed and to control quantity to be dispensed.

23 Claims, 7 Drawing Sheets

FLUID DISPENSER WITH POSITIVE DISPLACEMENT PUMP

TECHNICAL FIELD OF THE INVENTION

The invention relates generally to apparatus and methods for dispensing fluids onto a surface. More particularly, the invention provides a dispenser that utilizes positive displacement for the supply of fluid material to the dispenser head rather than pressure feed and additional features to provide a more uniform and consistent application to the surface.

BACKGROUND OF THE INVENTION

Many industries utilize dispensing systems to apply liquid material to a surface. In the motor vehicle industry, for example, liquid primers are applied to a perimeter region of a windshield as part of the process for installing a windshield in a vehicle body. These primers may be of various types and are preparatory to applying a urethane bead to the windshield that bonds the windshield to the frame. In a typical process, the windshield manufacturer applies a roughened black ceramic frit to a marginal or perimeter region of the windshield on the side of the glass that is bonded to the frame. Before the urethane bonding material can be applied to the frit, a first type of primer must be applied to the surface of the frit with a rubbing action. Often this first type primer is clear in color and is a surface activator that quickly evaporates and prepares the frit surface for application of a second type primer. In order to be effective, however, the clear primer cannot be simply applied but must be applied with a rubbing action as well.

After the clear primer is applied, a second type primer is applied to the frit, again with a rubbing action. Typically the second primer is black in color. The black primer improves adhesion of the urethane to the frit, but more importantly functions to block ultraviolet radiation that would otherwise cause degradation of the urethane. The black primer tends to have a higher viscosity than the clear primer, with the latter having a viscosity about that of water. A typical black primer may have a viscosity, for example, of about 40-100 centipoise.

The primers may be applied to the windshield by manual operations, but more commonly they are applied by dispensing the primer onto the frit using a liquid dispensing gun, and then applying a rubbing action by robotically moving a piece of felt across the frit by relative movement between the windshield and the gun. In a known process commonly referred to as "drip and drag", the primer is applied onto the frit just ahead of the felt. The primer may be intermittently applied rather than continuously. When the type of the primer is changed, the felt must be changed or an opposite surface of the same felt piece used.

One such system utilizing a drip and drag process is disclosed in U.S. Pat. Nos. 5,277,927 and 5,370,905 which are owned by the assignee of the present invention, the entire disclosures of which are fully incorporated herein by reference. These patents provide a more detailed description of such apparatus and the various technical issues involved with applying these primers to a windshield.

Although the above referenced systems are a significant advance in the art, they as well as other known systems have limitations. For example, some known systems require manual changeover of the felt piece either for each type primer change or after each windshield is completed. This results in a substantial consumption of the felt material. Still further, most vehicle windshields are not flat panes of glass but rather are curved, some more than others, particularly near the marginal area or perimeter. This can cause a loss of or diminished contact between the felt applicator and the frit, especially as the robotic arm passes around corners. The drip and drag process can result in an uneven application, particularly of the more viscous black primer. The felt tends to push the primer ahead of it, thereby diverting primer to either side resulting in a "railroad track" profile in which the edges of the bead are thicker than the center region of the bead. Additionally, since the primers are applied by pulsing a dispensing gun on and off, it can be difficult to control the amount of liquid material applied to the frit.

Another system is described in U.S. Pat. No. 6,695,917 B2 issued to Wright et al and owned by the assignee of the present invention, the entire disclosure of which is fully incorporated herein by reference. The Wright system uses, in some embodiments, a dual rub concept wherein the rub blocks include respective dispensing nozzles and control valves. Fluid to be dispensed is supplied under pressure to the valve and nozzle. Quantity of material dispensed may be controlled for example by flow meters and flow regulators, or based on time duration that the valve is open to flow. However, accuracy of pressure based delivery systems is dependent on known viscosity characteristics of the fluid being dispensed.

SUMMARY OF THE INVENTION

In accordance with one aspect of the invention, a fluid dispensing apparatus uses positive displacement of the fluid for accurate metering of the quantity of liquid applied to a surface. Positive displacement refers generally to the idea of having a metering volume that is filled and emptied so that each cycle corresponds to an accurate volume of material dispensed independent of viscosity. In one embodiment, a fluid dispensing system includes a positive displacement piston pump. The pressure of the dispensed fluid can be quite low, such as about one psi or less for example, providing a better flow of material from the dispenser to form a uniform and controlled application.

In accordance with another aspect of the invention, in some situations the fluid being dispensed is flammable. In such situations, a fluid dispensing apparatus according to the invention uses a positive displacement function that is driven by a non-electric energy source. In one embodiment, the energy source is realized in the form of an air motor that drives a positive displacement pump.

In accordance with another aspect of the invention, control of the fluid quantity dispensed is performed by using a variable speed function to drive a positive displacement function. In one embodiment, the drive function is realized in the form of a variable speed air motor that drives a positive displacement function that is realized in the form of a positive displacement pump. In still a further aspect of the invention, the use of a variable speed drive function with a positive displacement function facilitates the use of the dispensing apparatus with a robotic function that moves the dispensing apparatus across a surface with a predetermined dispense rate versus position profile.

In accordance with another aspect of the invention, a fluid dispensing apparatus contemplates application of a positive displacement function to the fluid to supply the fluid to a dispensing orifice along a fluid flow path, wherein the fluid flow path is an unobstructed passage between the outlet of a positive displacement pump and the dispensing orifice.

In accordance with another aspect of the invention, the invention contemplates the methods embodied separately or together in the operation, functionality and use of apparatus in accordance with the invention. Moreover, the invention contemplates a method for dispensing primer onto a windshield surface with the method including metering a fluid material by cyclically filling and emptying a metering volume, controlling volume dispensed onto a surface by controlling the cycle rate, and applying a rubbing action to the primer against the windshield surface.

These and other aspects and advantages of the present invention will be readily appreciated and understood from the following detailed description of the invention in view of the accompanying drawings.

DETAILED DESCRIPTION OF THE INVENTION

Figure 1:
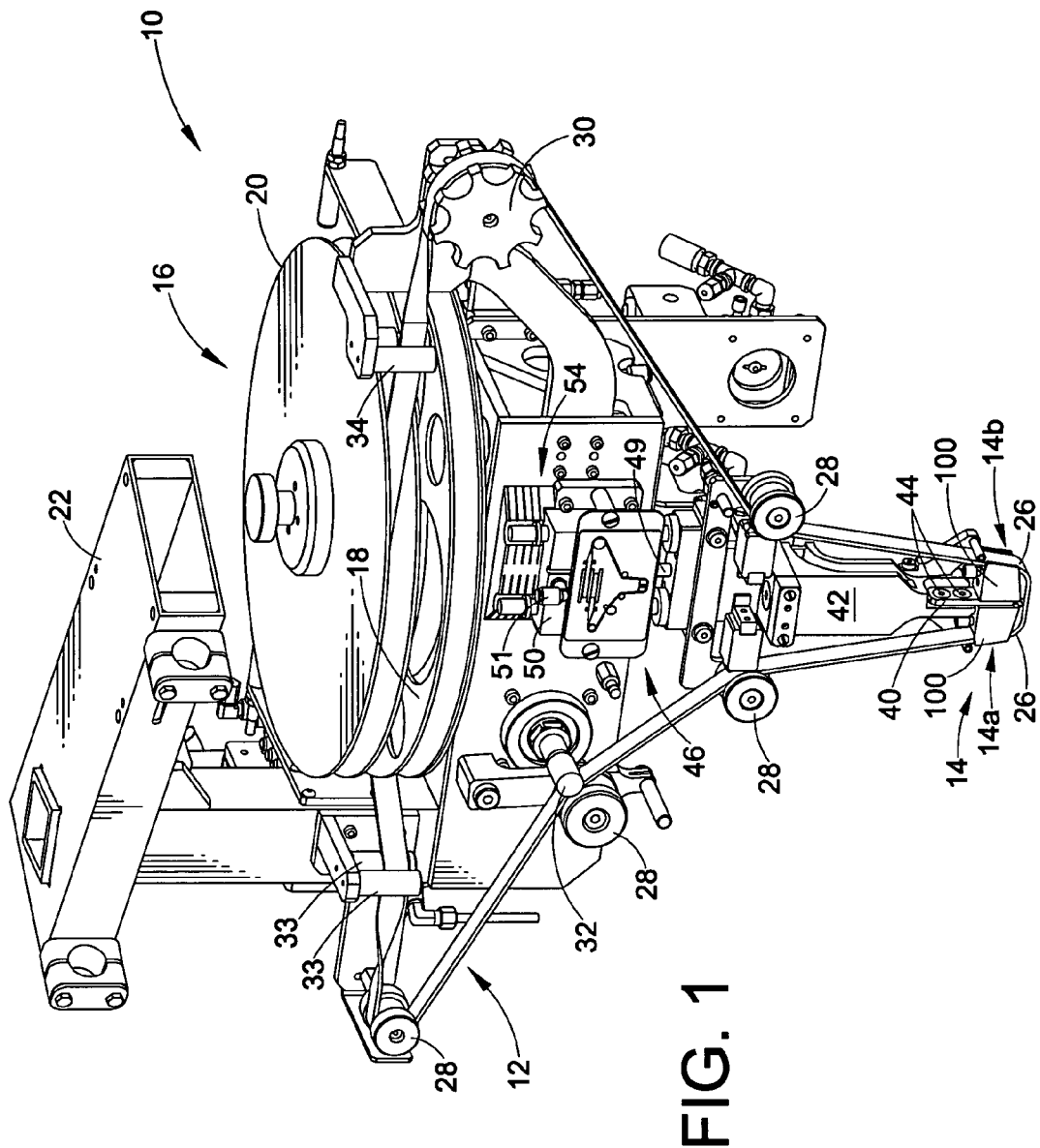
FIG. 1 is a perspective view of a first side of a liquid dispensing apparatus in accordance with the invention.

The present invention is directed to fluid dispensing apparatus for applying fluid to a surface. Although the invention is described herein with reference to a flow through felt dispenser, such as of the type described in the above-identified Wright et al patent, such descriptions are intended to be exemplary in nature and should not be construed in a limiting sense. Those skilled in the art will readily appreciate that various aspects of the invention may be used in different fluid dispensing apparatus without specific limitation as to the type of fluid, the surface, the design of the dispensing head and so on. For example, various functional and operational aspects of the invention are illustrated in an exemplary embodiment in FIG. 2 hereof without any particular limitation as to the structural dispenser features. The invention may find application to a flow through felt dispenser and applicator or a drip and drag type applicator to name two examples.

Many parts of the exemplary embodiment herein are similar in form and function to the apparatus described in the Wright et al patent and need not be repeated herein for a full and complete appreciation of the present invention. For example, the Wright et al patent fully describes and illustrates the nature of the robotic movement and connection, color sensor, tilt feature, single and double rub block embodiments and so on. Such additional details of the apparatus may be obtained from a reading of the Wright et al patent in conjunction with the present disclosure, however, the present disclosure fully sets forth the teachings needed to understand and practice the present invention. To the extent that the various aspects of the present invention differ from the Wright et al patent, such differences will be noted herein.

While the invention is described with particular reference to the application of two types of primers such as, for example, clear and black primers to a receiving surface such as a vehicle windshield, such description is intended to be exemplary in nature and should not be construed in a limiting sense. Those in the art will readily appreciate and understand that the invention may be used in other liquid dispensing applications including but not limited to the application of other types of primers or liquids to different types of receiving surfaces or substrates. It is noted that primers may be of different types though not necessarily different in color.

While various aspects of the invention are described and illustrated herein as embodied in combination in the exemplary embodiments, these various aspects may be realized in many alternative embodiments, either individually or in various combinations and sub-combinations thereof. Still further, various alternative embodiments as to the various aspects and features of the invention, such as alternative materials, structures, configurations, methods, devices, software, hardware, control logic and so on may be described herein, but such descriptions are not intended to be a complete or exhaustive list of available alternative embodiments, whether presently known or later developed. Those skilled in the art may readily adopt one or more of the aspects, functions, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are only intended to be critical values if so expressly stated.

A. General Description

Figure 2:
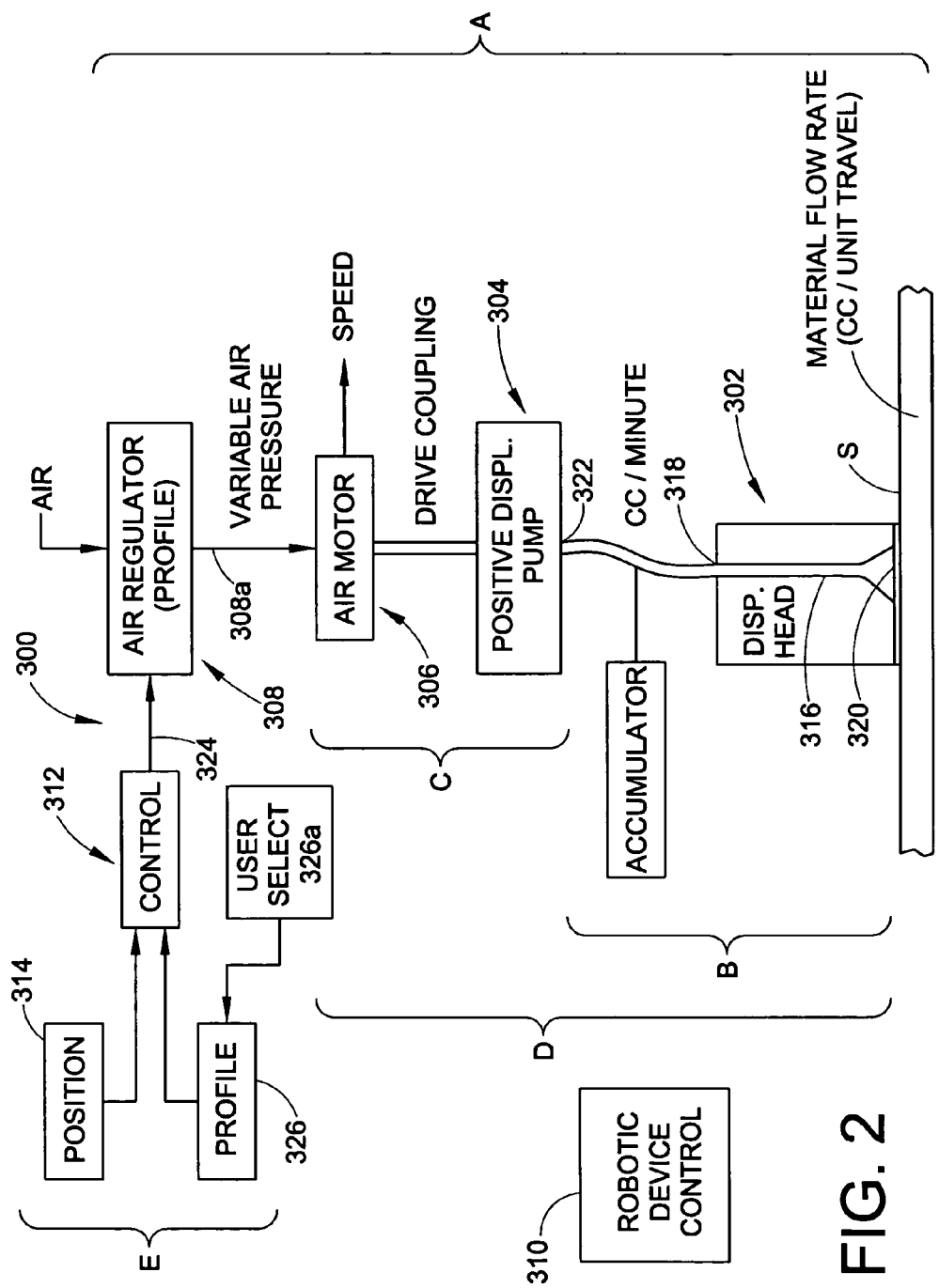
FIG. 2 is a functional schematic of various aspects of the present invention.

With reference to FIG. 2, an overall fluid dispensing system 300 and associated functionality in accordance with various aspects of the invention is indicated by the bracket A. The functionality of the overall system 300 includes an application function 302 that applies fluid to a surface S, a metering function 304, a dispensed fluid volume control function 306, and a variable volume control function 308. Bracket B identifies a dispensing sub-combination that includes the application function 302 and the metering function 304. Bracket C identifies a supply sub-combination that includes the metering function 304 and the volume control function 306. Bracket D represents a robotic device function 310 that may be used to move the dispensing apparatus 300 relative to the surface S for application of the fluid thereto. Bracket E identifies a robotic position based dispensed volume control function 312 that includes the variable volume control function 308 and a position indication 314 from the robotic function 310. The sub-combinations and control functions identified in FIG. 2 represent aspects of the present invention as used in various combinations and sub-combinations but is not intended to be an exhaustive list of all such permutations.

In the exemplary embodiment herein, the application function 302 may be realized in the form of a dispensing head, such as a rub block described hereinafter, having an unobstructed fluid flow passage 316 from an inlet 318 to an outlet orifice 320. By uninterrupted is meant that the flow path is open whether the dispensing head is applying fluid or not. In other words, the flow passage 316 is free of any flow control or flow restricting devices such as, for example, a valve. The metering function 304 may be realized in the form of a positive displacement pump. An advantage of the positive displacement pump is that it functions also as an on/off device for fluid control. In other words, when the pump is not stroking there is no flow. This feature obviates any need for a flow control device in the dispensing head or elsewhere in the flow path between the pump outlet and the dispensing head, therefore an unobstructed and open flow passage is provided from the pump outlet 322 to the outlet orifice 320. The dispensed fluid volume control function 306 may be realized in the form of an air motor. The air motor speed determines the cycle rate of the pump thereby controlling the amount or volume of material dispensed. However, other devices may be used in lieu of the air motor including an electric motor. The air motor is useful, for example, with dispensed fluids that require intrinsic safety to prevent explosions or combustion. The variable dispensed fluid volume control function 308 may be realized in the form of a variable output pressure air regulator, which when used in combination with a variable speed air motor allows the control of the volume of dispensed fluid by controlling the speed of the air motor based on the air pressure supplied to it. As noted in FIG. 2, a speed signal may be used to monitor pump output and to verify that the pump is operating at the correct speed relative to the motor speed. The position based volume control function 312 may be realized in the form of a control circuit that controls an input signal 324 to the variable output pressure regulator 308. In the exemplary embodiment, the input signal 324 is a function of the position signal 314 and a dispense rate profile function 326. The dispense rate profile function 326 relates position to a desired dispensing rate or volume. The dispensing rate or volume may further relate to a desired thickness or other characteristic for example of the fluid applied to the surface. In other words, for each positional increment indicated by the signal 314 there will be a signal 324 that sets the flow rate from the pump. This is effected in one embodiment by the control function 312 providing a position dependent voltage signal to the variable regulator to control the output pressure to the air motor and thus to control the dispense rate from the pump. The position signal may be based on the position of the robot or the dispensing head or some other position dependent feature that is provided to the control circuit to access the appropriate dispensing rate or volume information. The system 300 thus controls the output volume flow rate from the pump 304 in cc per unit for example, and this is directly correlated to the applied flow rate of fluid onto the surface S, for example in terms of cc per unit travel.

Figure 3:
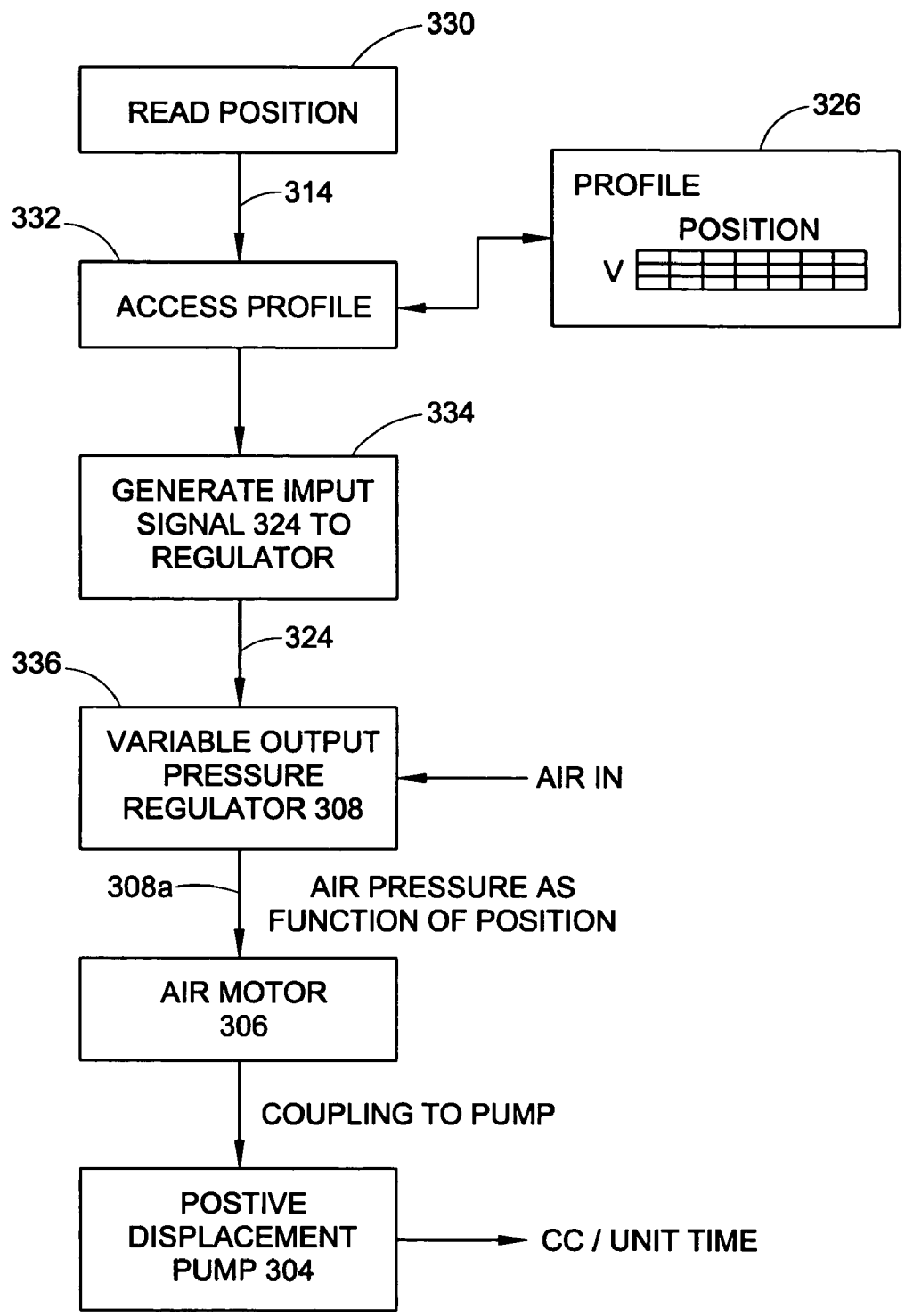
FIG. 3 is a functional flow diagram for an exemplary control function suitable for the present invention.

The dispense rate profile function 326 may be a single profile stored in the control circuit electronics, or there may be a plurality of different profiles stored so that an operator may select or change a suitable profile for a particular application. For example, the operator may select a different profile through a user select function 326a, such as through any suitable input device such as a keyboard for example. The use of multiple profiles is represented in FIG. 3 by the array for V and POSITION where for example each horizontal row could be a different selectable array.

The invention thus provides accurate and precise control of the volume of material applied to a surface by using a positive displacement function and a cycle rate control function to adjust the speed that the positive displacement function operates at, thereby controlling the volume of fluid dispensed.

With reference to FIGS. 1 and 2, the numeral 10 generally indicates an exemplary embodiment of a fluid dispenser in the form of a flow through fluid dispensing apparatus in accordance with and that embodies various aspects of the present invention. The dispensing apparatus 10 includes three basic sections, namely a porous material 12, at least one dispensing head section 14 and a supply mechanism 16 for feeding an unused portion of the porous material 12 for a dispensing application. In the exemplary embodiment the porous material 12 is in the form of a continuous felt web, and the supply mechanism 16 includes a supply reel 18 and a take-up reel 20. This arrangement allows for an automatic advance or indexing of the web 12 prior to each dispensing operation or between a selectable number of dispensing operations. Alternatively, however, a piece of porous material 12 may be manually installed in the apparatus 10 as required and thus the supply mechanism 16 may be omitted. Use of the automatic supply feature however will typically improve throughput speed.

The exemplary embodiment utilizes a pair of dispensing heads 14a, 14b positioned side by side along a direction of travel "Y" of the apparatus 10. The dual head configuration is used in this case for a typical windshield application of a clear and black primer. The dual head arrangement thus substantially reduces the amount of porous material used during a dispensing operation since the porous material need only be advanced or indexed one time for each complete application of a clear and black primer. Single heads may be used for applications requiring only a single application for example. As another alternative, a single dispensing head may be used that includes an internal flow path in the form of a Y with a single common output and each branch of the Y being connected to one of the two fluid sources. This may be useful, for example, in the application of two-component materials or where contamination between the two sources of liquid is not a concern.

Figure 6:
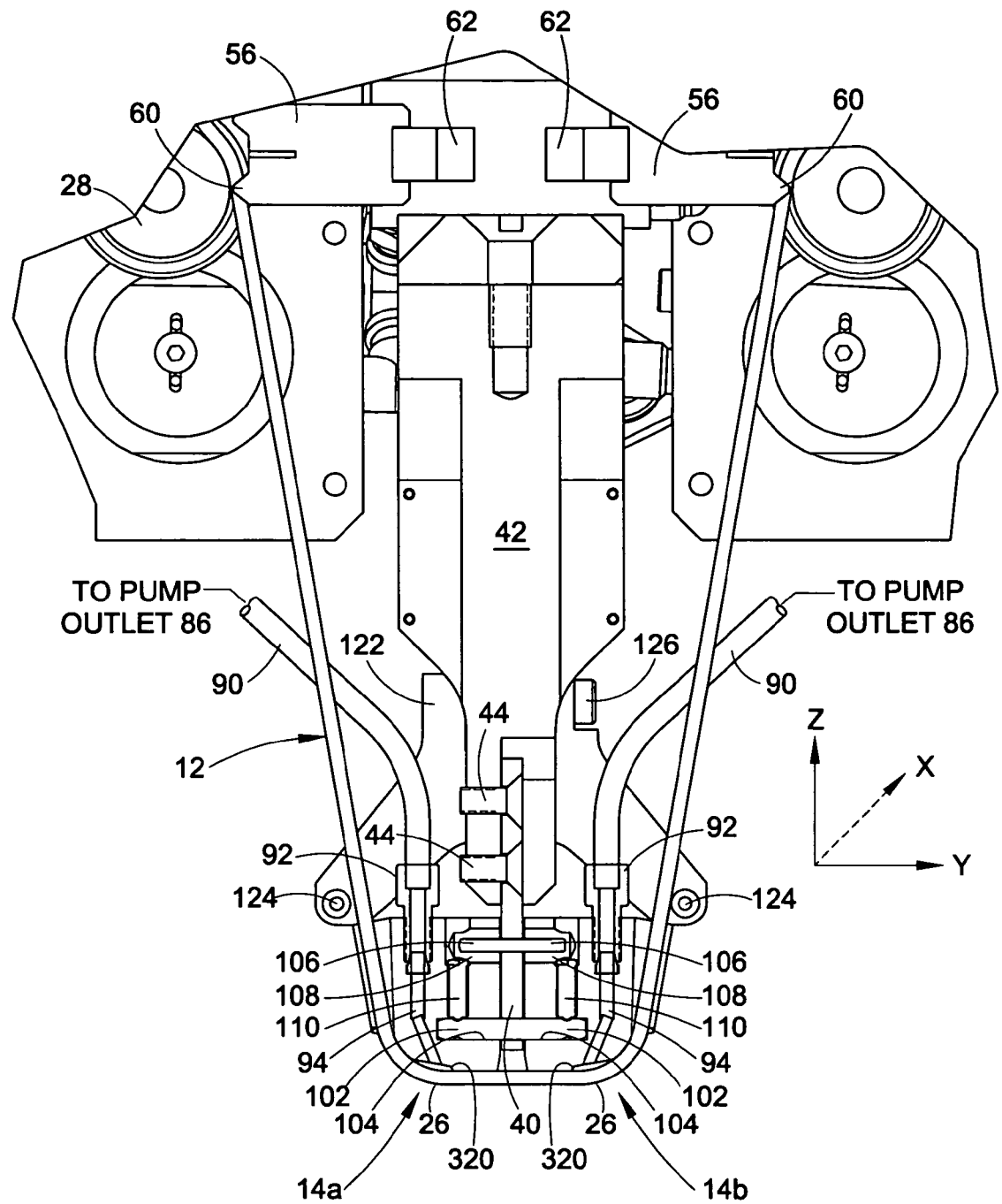
FIG. 6 is an enlarged view of the circled portion of FIG. 5.

In FIG. 6, the XYZ axes are provided as a frame of reference with the Z axis being the vertical axis along which the dispensing section 14 is positioned with pressure against the receiving surface S of the windshield. Pressure and position controls (not shown) may be used to maintain pressure between the dispensing section 14 and the receiving surface S to assure that the primers are dispensed with a good rubbing action between the porous material 12 and the surface as is known. The Y axis represents the direction of relative movement between the dispensing section 14 and the surface of the windshield. In this embodiment the Y axis also corresponds to the direction that the porous material 12 is advanced. The X axis completes the frame of reference such that, as an example, a windshield or other surface onto which liquid material is dispensed would generally lie in the XY plane.

The dispensing apparatus 10 is moved relative to the windshield or receiving surface S by any suitable robotic or motion device. For example, the apparatus 10 may be mounted to a robot arm programmed to move the dispensing section 14 along the outer perimeter of a stationary windshield held in a jig or other suitable fixture. Alternatively the dispensing apparatus may be stationary and a robot or other platform used to move the windshield. Both could be moved if so desired. Whatever method is selected, material is dispensed by contact pressure between the dispensing section 14 and the windshield by relative movement there between. The robotic control may also be used to control rotating or tilting the apparatus 10 about the X-axis so that only one of the dispensing heads 14 contacts the surface S at any given time. This feature of the robot control and tilting is fully disclosed in the Wright et al patent and reference may be made thereto for additional discussion.

The robotic device 310 generates a suitable signal 314 (FIG. 2) that indicates or corresponds to position as the apparatus 10 traverses about the surface S. The position information is useful because it may be desirable in some applications, although not required in all applications, to adjust the dispensing rate of the material based on the position of the apparatus. For example, typically the robot will slow down around turns or corners and speed up along straight sections. These speed variations may be taken into account by adjusting the dispensing rate so that a uniform volume of liquid is applied to the surface. In the present invention, for each incremental position 314 reported by the robot 310 a dispensing rate profile is accessed to assign a desired dispensing rate at that position. The actual dispensing rate is adjusted to the desired rate by adjusting the cycle rate of the positive displacement pump 304 via the variable speed air motor 306. The dispensing rate profile may, for example, be stored and accessed as a software or memory database. In one configuration, the database is empirically determined by noting the desired dispense rate for each incremental position report, such as a conventional look-up table. In the exemplary embodiment the look-up table provides the signal value 324 (FIG. 2) as a function of the position signal 314, wherein the signal 324 is used to adjust the air regulator output pressure 308a that drives the air motor 306 which in turn operates the pump 304.

FIG. 3 illustrates an exemplary functional flow diagram for the control function 312. The control function 312 may be implemented in many different ways, including programmable microprocessors, computers, discrete logic, PLCs and so on. At step 330 the control function reads, receives or accesses the position signal 314 and accesses the stored profile 326 at step 332. At step 334 the control function produces an appropriate signal 324, in the exemplary embodiment a voltage signal the value of which was obtained from the profile 326, to the variable air regulator 308. At step 336 the air regulator produces an output air pressure 308a that drives the air motor 306 which in turn drives the positive displacement pump 304, thereby controlling the output volume dispensing rate. Since the volume dispensed is a function of position, the apparatus 10 controls volume dispensed per unit travel or in other words as a function of position so as to maintain a uniform coating or bead on the surface. This is an open loop control function in that the dispense rate is a function of position and the dispense rate values in the associated profile 326 (FIG. 2). Repeatability and accuracy are achieved because the air motor, air regulator and pump are highly repeatable and controlled functions. A suitable pump is Model Q1CSC-W available from FMI Pumps. Alternatively, closed loop control functions may be used.

The use of a dual head dispensing section 14 significantly speeds up a dispensing operation for clear and black primers to a windshield. As illustrated, the dispensing apparatus 10 includes a frame 22 having a suitable robot mounting interface arrangement to mount the apparatus 10 onto the end of a robotic arm. The robotic device not only moves the apparatus 10 along the perimeter of the windshield surface, but also can pivot or rotate the apparatus 10 about the X axis and hold that position during a dispensing operation so that only one dispensing head 14a, 14b is in contact with and applying liquid material to the receiving surface S at any given time. Techniques other than tilting may be used to present only one dispensing head 14 at a time to the receiving surface S. For example, each head 14a, 14b may be raised or lowered independently along the Z-axis. Other techniques will be readily available as required, and in some applications it may not always be necessary to keep one of the heads 14 out of contact during dispensing operations.

It is important to note that the present invention is not limited to flow through felt dispensers as described in the exemplary embodiment. The invention will find application in other dispensing arrangements including but not limited to drip and drag systems.

The amount of pivoting movement about the X axis will be determined by the size of the dispensing heads 14a, 14b and the desired clearance between the non-contacting dispensing head and the surface S during the time that the other dispensing head is being used. A rotation of about 10° on either side of vertical (Z axis) provides adequate clearance, however, other pivot angles may be used as required. The clearance is desirable so that black primer does not collect on or cross-over to the clear primer dispensing head.

To further reduce cross-over of one primer type to the adjacent dispensing head, the direction of travel of the apparatus 10 is preferably selected so that the active dispensing head is the rearward or trailing head relative to the direction of travel. Thus the robotic arm R reverses the direction of travel when switching between dispensing heads 14a, 14b. By having the active head trailing the raised head, the liquid material is dispensed onto the surface S behind the raised dispensing head and cannot come into contact with the raised head.

Although the reverse travel feature and trailing dispensing head arrangement are preferred techniques, they are not required. The active dispensing head could be the leading or forward head. Separately or in combination therewith, the robot could be used to move the apparatus 10 in a single direction if so desired.

With continued reference to FIGS. 1 and 3, the porous material 12 in this example is a continuous web or loop of material such as a thin web of felt. During each dispensing operation, however, only a small portion 26 of the felt 12 actually is in contact with the surface S. The contact portion 26 of the felt overlays a part of the dispensing head 14 called a rub block 100. As fully described in the Wright et al patent, the rub block 100 presses the felt against the surface S and provides a passageway for a pressurized flow of liquid material to soak the felt during a dispensing operation. The rub block 100 in the present application differs from the rub block in the Wright et al patent in that the present invention does not use a nozzle or valve within the rub block. However, the rub blocks may be the same in terms of the galley and outlet orifice geometry. For purposes of convenience then, each dispensing head section 14 is considered to include a small felt section 26 that is sandwiched between the corresponding rub block 100 and the receiving surface S because preferably, although not necessarily, only felt contacts the surface S during a dispensing operation.

Unused felt web 12 is stored on the supply reel 18 and used felt is recovered by winding it onto the take-up reel 20. To reduce the size of the apparatus 10, the reels 18, 20 are arranged horizontally and are stacked vertically one above the other. Alternatively, the reels 18, 20 may be supported side by side much like a reel to reel movie projector or tape player. Other mounting techniques may be use as required for a particular application as will be readily apparent to those skilled in the art.

Figure 4:
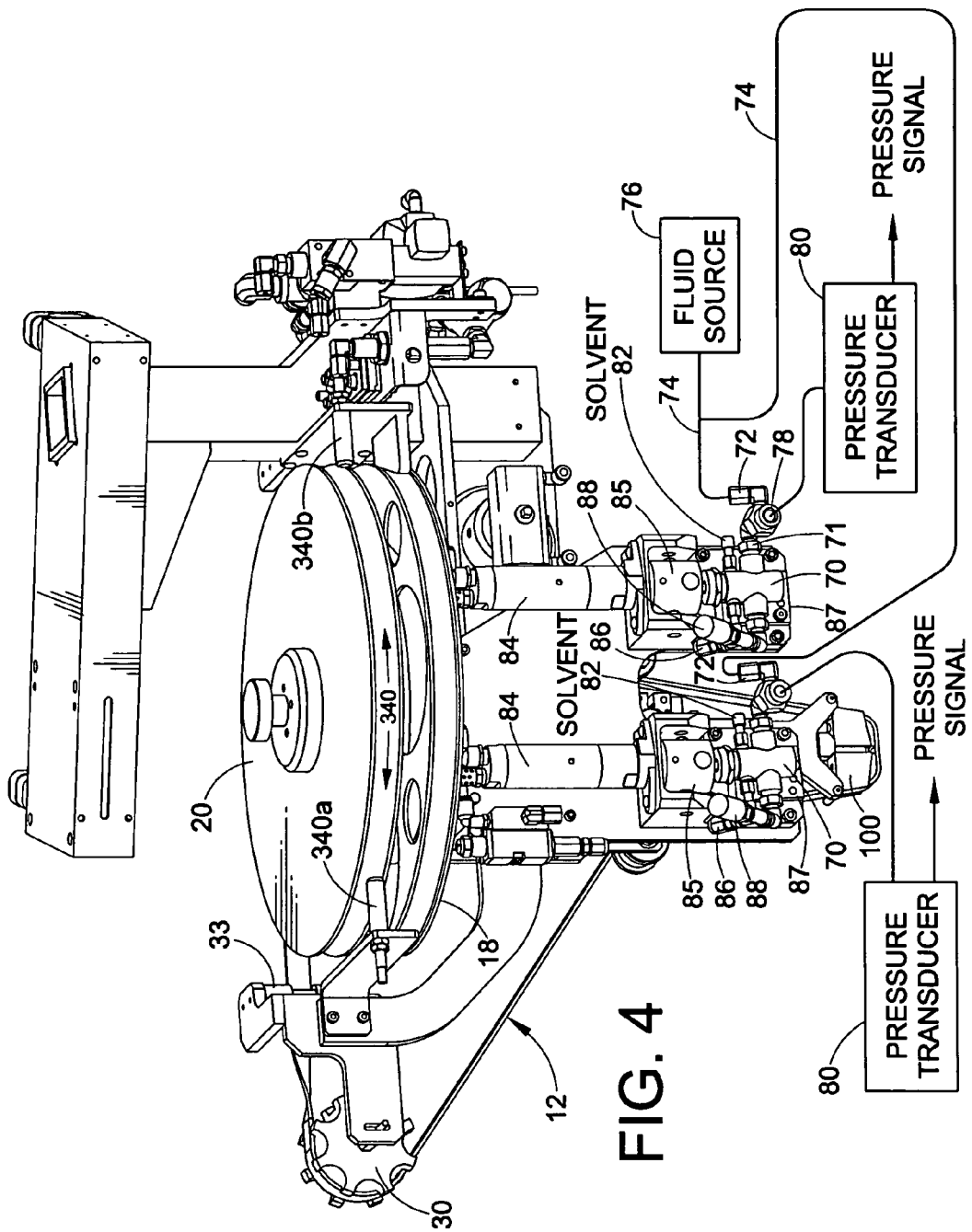
FIG. 4 is a perspective view of an opposite side of the liquid dispensing apparatus of FIG. 1 in accordance with the invention.

With reference to FIG. 4, an optical sensor arrangement 340 is provided for the take-up reel 20. In this embodiment the sensor 340 include an emitter 340a and a receiver 340b. The emitter and receiver are appropriately positioned so that when a predetermined amount of felt fills the take-up reel, the sensor 340 detects this condition and sends an appropriate signal to a control function for the motor that turns the take-up reel to increase torque.

A suitable number of tensioning rollers 28 are used to support and guide the felt web around the dispensing heads 14. A payout roller 32 may be used in the form of a highly frictional roller, such as having a large number of sharp protrusions to provide good grip of the felt and a positive drive. A sprocket type idler roller 30 is used to guide the used felt which may be hardened, while at the same time reducing contact between the roller and the felt for situations where the felt may not be completely dry.

In this embodiment, because the supply and take-up reels 18, 20 are vertically stacked and payout the web 12 in a plane that is transverse to the plane XY, the felt web 12 will include a 90° twist as illustrated in the drawings via rollers 33 and 34 to properly overlay the rub blocks 100.

Controlled payout and movement of the felt web 12 may be realized with conventional pneumatic or other suitable drive mechanisms. A small pneumatic motor 36 may be used to oppositely turn the reels 18, 20 thus placing the web 12 under tension.

The payout roller 32 as noted has a non-slip surface that allows the roller 32 to advance the web 12 when the roller 32 is rotated. The payout roller 32 may be turned by any suitable drive mechanism such as a pneumatic motor. A typical payout for a new dispensing operation may be about two inches but will depend on the size of the dispensing head section 14 and how much liquid material spreads into the web 12 in the vicinity of the dispensing heads 14. The felt web 12 is advanced a sufficient amount to assure that a completely new portion 26 of the web 12 is presented at the rub blocks 100 prior to a selected dispensing operation. Note that the felt web 12 is clamped in position relative to the rub blocks 100 during an actual dispensing operation. New or unused felt is advanced by the payout roller 32 before the next dispensing operation by unclamping or releasing the felt web 12. When a dual dispensing head configuration is used it is contemplated that one complete dispensing operation includes dispensing fluid from a first of the dispensing heads 14 and then the other. The side by side dispensing heads 14a, 14b thus minimize the amount of felt 12 used during a dispensing operation of applying two primers to the receiving surface S.

Note that preferably the felt web 12 is only advanced in a single direction across the rub blocks 100. Furthermore, because the felt web 12 physically contacts the rub blocks 100, each indexing or advancement of the web 12 produces a wiping action that helps clean the rub blocks between dispensing operations. This is particularly useful for the clear primer dispensing head which preferably is first to encounter a new or clean portion of the felt web 12. Thus in the exemplary embodiment for example, the clear primer dispensing head would be the left side head 14a (as viewed in FIG. 1).

B. Dispensing Head and Material Supply Section

Figure 5:
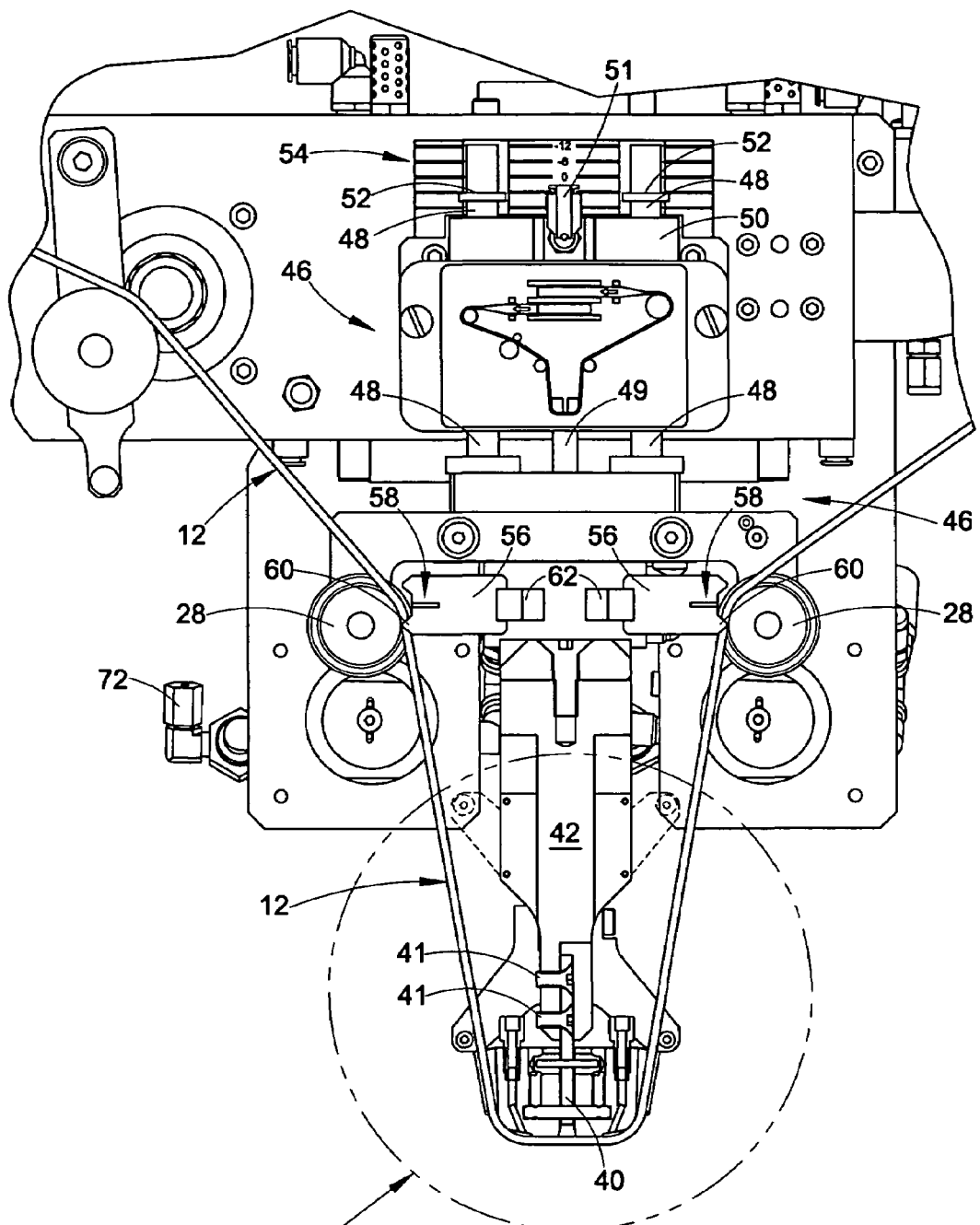
FIG. 5 is an enlarged view of the circled portion of FIG. 2.
Figure 7:
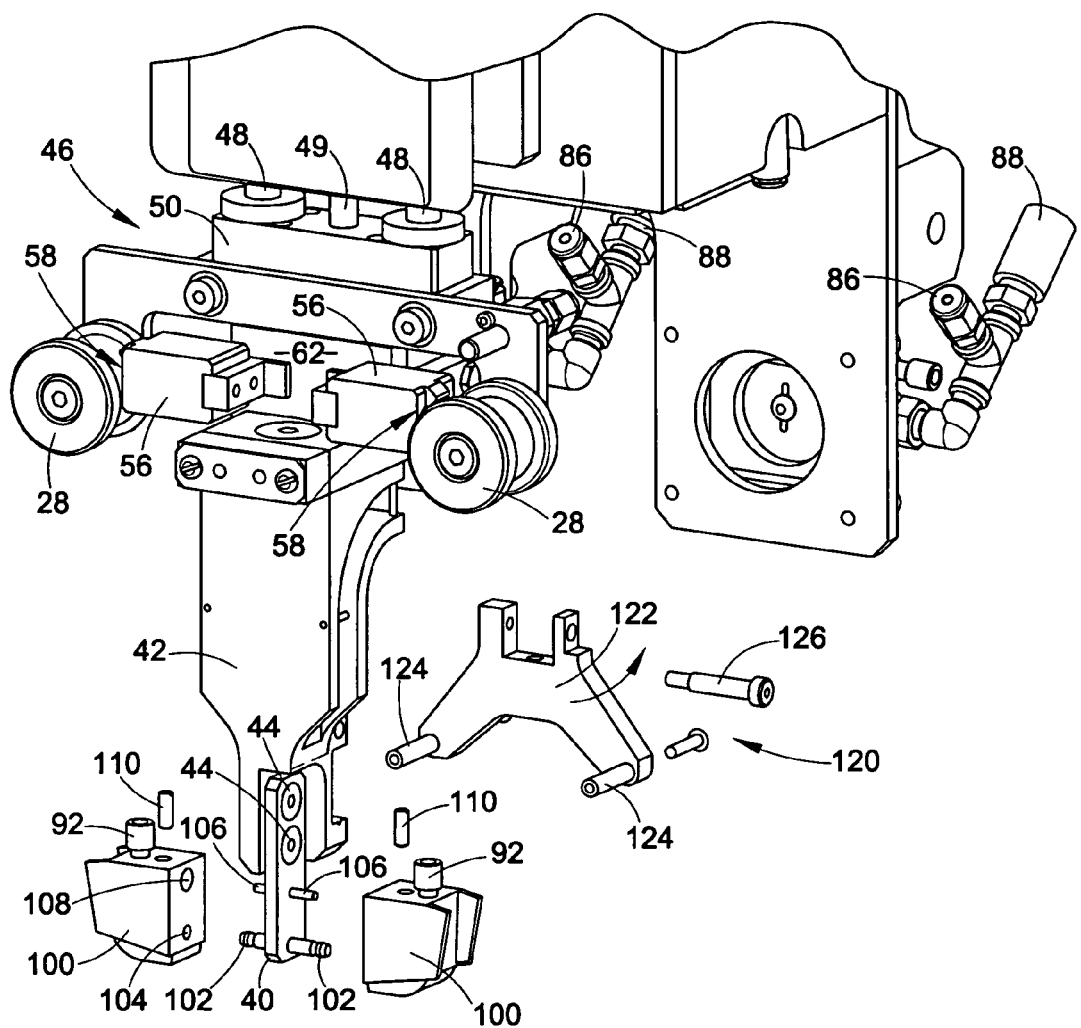
FIG. 7 is an exploded perspective of a rub block arrangement.

With reference to FIGS. 5-7, the dispensing head section is illustrated in an enlarged view. In this embodiment there are two dispensing heads 14a, 14b that are substantially the same in design and operation, therefore, a detailed description of only one (14a) will be given herein.

The dispensing head 14a includes a rub block 100 that is installed on a rub block mounting arm 40 (FIG. 7) which is secured to an extension 42 using bolts 44 or other suitable devices. The extension 42 is secured to a pneumatic slide arrangement 46. The slide arrangement 46 includes guide rails 48, a piston 49 and a pneumatic slide 50. The slide 50 may be raised or lowered along the Z axis, for example, by application of pressurized air to an air inlet 51 to position the dispensing head 14a in contact with the receiving surface S. Conventional pressure and position controls may be used to maintain a fairly constant pressure of the rub block 100 and felt 26 against the surface S during a dispensing operation even for irregular surface contours.

The slide 50 includes an indicator 52 that cooperates with a scale 54 that is fixed in position relative to the slide 50. The indicator 52 provides a visible feedback indication to the operator as to when the rub blocks are at a 'zero' position meaning that the slide is about in the middle of its range of travel up and down. This visual feedback of the slide position may be useful when initially setting up the apparatus to assure that good contact will be maintained between the rub blocks, the felt and the surface S.

Although the felt web 12 should have some slack or give to permit the dispensing head section 14 to adjust along the Z axis, it is desirable to maintain the felt portion 26 taut and snug against the rub block 100. Accordingly, a pair of pinch blocks 56 are provided. The pinch blocks 56 include respective pinch faces 58 that securely hold the felt against the associated rollers 28. An actuator 62 is used to move the pinch blocks 56 laterally to the position illustrated in FIG. 5. In this position, each face 58 includes an edge 60 to snugly hold the felt web 12 against the roller 28. The pinch blocks 56 may be opened by lateral movement to release the clamping grip when it is desired to index or advance the felt web 12.

With reference to FIGS. 4 and 6, the present invention provides a positive displacement function for supplying fluid to the dispensing heads 14 or rub blocks 100. The fluid supplies for each dispensing head may be the same in construction and operation therefore only one will be described herein.

In accordance with this embodiment of the invention, a positive displacement piston pump 70 is provided, having an inlet fitting 72 for connection to a feed hose 74 that receives a supply of fluid from a source 76. Another fitting 78 is provided for installing an optional pressure transducer 80 near the pump inlet 71. Each pressure transducer generates a pressure related signal that can be monitored by a suitable control function. The pressure may be monitored to assure that there is adequate intake pressure to the pump to assure there is flooded suction at the pump inlet. Adequate inlet pressure assures reliable and consistent operation of a positive displacement pump. In the exemplary embodiment the pumps 70 also optionally include a solvent inlet 82. The use of a solvent can reduce the presence of air in the fluid exiting the pumps. For example, primers may start to cure when they come into contact with air, thus the solvent may be used in such applications. The solvent does not flow with the dispensed fluid, but rather is present within the pump and acts as a barrier to air. The solvent surrounds the interior piston of the pump 70 but does not otherwise flow, and prevents air from contacting the fluid being dispensed.

Each pump 70 may be a piston pump having a piston chamber that defines a metering volume. By metering volume is meant that the pump has a volume that can be filled and emptied with a repeatable quantity of material during each pump cycle. The metering volume is generally determined by the size of the piston chamber and the stroke of the piston. The metering volume need not be the same as the volume of the piston chamber. The exemplary pump identified herein is a ceramic piston pump that only has one moving part, the piston, to minimize any entrapment areas. Other positive displacement devices however may be used. The use of positive displacement pump also eliminates any need for flow control valves or devices.

The pump fills the metering volume for each half cycle during the intake stroke of the piston. During the discharge stroke the piston displaces the fluid through the pump outlet to a delivery line that runs to an inlet to the rub block. Therefore, the amount of material delivered each cycle from the pump is precisely known and independent of variables such as viscosity, temperature, line losses and so on. For the exemplary pump, the piston translates within the piston chamber and also rotates (note that the pump inlet and outlet are diametrically opposite each other) in response to operation of the volume control function 306 (FIG. 2) which is an air motor in the exemplary embodiment.

Each pump 70 is driven by an air motor 84. Each air motor 84 receives pressurized air from the air regulator 308 (FIG. 2) and operates at a rotational speed that is a function of the air pressure. The speed of the air motor 84 determines the cycle rate of the pump 70 because the air motor directly drives the pump piston through an appropriate coupling 85. The coupling 85 body rotates by being driven by the air motor 84, and the coupling is mechanically coupled to a shaft of the pump 70 so that rotation of the coupling 85 causes both rotation and translation of the piston inside the pump 70. The faster the pump is driven the more fluid is discharged from the pump in cc/unit time. The use of an air motor provides an intrinsically safe environment for flammable fluids being dispensed but as noted is not required for all applications.

The mechanical coupling between the rotating coupling 85 and the pump 70 in this embodiment is such that the pump shaft is at an angle relative to the central axis of the coupling. Varying this angle will vary the pump output flow rate. It will be noted from FIG. 4 that the left side pump 70 (as viewed in the drawing) is mounted at a different angle than the right side pump, thus in this embodiment the pumps operate at different flow rates, as may be desirable for example for two primers applied to a windshield. The pumps may alternatively be run at the same flow rate. In order to allow for flow rate setting, a mounting plate 87 is provided for installing the pumps at a desired angle relative to the associated coupling 85. The plate 87 may be provided with a plurality of mounting holes so that discreet alignment positions for each pump may be selected depending on the desired flow rate. Alternatively an alignment slot could be used for infinite alignment positions if so required. Discreet positions may be preferred in some applications because the alignment of the pump 70 and the coupling 85 must be stable in order to maintain the system in calibration, because flow rate will change if the alignment angle shifts or is purposely changed.

With reference to FIGS. 4 and 6, each pump 70 has an outlet 86. An optional accumulator 88 may be provided in fluid communication with the flow path of the fluid from the pump outlet port. The accumulator 88 operates in a known manner to help smooth out pulsing of the fluid delivered to the rub block 100. A delivery line 90 (FIG. 6) is connected at one end to the pump outlet 86 and at the other end is inserted into an inlet fitting 92 at the top of the rub block 100. Note in FIG. 6 that the rub blocks are shown in partial section to illustrate the interior structure. The fitting 92 snugly holds the delivery line 90, but the delivery pressure to the rub block may be as low as 1 psi or less, although these values are exemplary in nature. Low pressure delivery allows for uniform liquid application during dispensing without the need for pressure reduction such as with a valve. Moreover, since each pump 70 is a positive displacement pump, when the pumps are off they function as an open/closed valve in that no fluid is delivered from the pumps.

Each rub block 100 includes an internal flow passage 94 (generally 316 in FIG. 2) that is unobstructed or uninterrupted for free flow from the inlet 92 to the dispensing orifice 320. Thus, in contrast to the Wright et al patent, there is no nozzle or valve member within the rub block, but only an unobstructed free flow passage. Fluid discharged from the pump 70 thus flows freely and directly to the felt 26 portion that contacts the surface S. The absence of a valve or other flow control device is particularly helpful with some materials such as the black primer.

A proximity sensor (not shown) may be used to count the number of pump cycles, as a way of monitoring how much material has been discharged from the pump. The proximity sensor may be used at the pump to detect movement of the piston or at the air motor or at the coupling between the motor and the pump.

All of the pneumatic and electrical control functions of the apparatus 10 may be executed using a conventional programmable microprocessor or micro-controller or other suitable control circuits as is well known to those skilled in the art. Pneumatic actuators and controls are not required as any suitable actuator design may be used.

C. Articulated Rub Block

With reference to FIGS. 6 and 8, not all surfaces and substrates onto which liquid material is to be dispensed are flat or planar. For example, vehicle windshields usually have a curvature, particularly about the perimeter or marginal edge. A rigid non-compliant dispensing head is therefore difficult to maintain in good contact with the surface, such as when the dispensing head travels around corner regions. The result of poor contact is an inconsistent bead or coating application and possibly missed areas.

In accordance with another aspect of the invention, a dispensing head design is used that more readily conforms to the variable contour of a surface. Such a compliant dispensing head produces a more consistent bead or coating application.

In the exemplary embodiment, a compliant dispensing head 14 is realized in the form of the articulated rub block 100. By "articulated" is meant that the block 100 has some degree of freedom to pivot about at least one axis so as to be able to maintain alignment with the surface S, thus assuring good contact between the felt section 26 and the surface S. Because the rub block 100 moves relative to the surface S along the axis Y, in the preferred embodiment the block 100 is designed to pivot or roll about the Y axis about 10° either side of normal. The degree of permitted articulation will depend on the extent of curvature present in the surface S. The ability of the block 100 to roll allows for workpiece variation and robot programming errors which typically are not more than about ±10°. The present invention is not limited by any specific degree of articulated movement, but most applications will be about 20° or less either side of normal (normal being 0° referenced to the Z axis). Articulated or pivoting movement about the Z axis (yaw) or X axis (pitch) is not as beneficial and may in some applications be undesirable. If the rub block 100 pivots or yaws about the Z axis, the felt 12 will tend to be oriented on a line other than the Y axis direction of travel, possibly producing an inconsistent bead or coating width or an incorrect orientation of the felt on the rub block 100. If the rub block 100 pivots or pitches about the X axis the felt web 12 might lose contact or have less pressure against the surface S. Since the apparatus 10 already compensates for Z axis variation, there is no need usually for the rub block 100 to be able to pitch about the X axis. In accordance then with this aspect of the invention, the rub block 100 is designed to articulate primarily about the Y or roll axis, and to be more restricted against pivoting about the X and Z axes.

Achieving a consistent bead or coating pattern is also a function of controlling the flow of liquid material through the felt web 12 as a function of the travel speed of the dispensing head 14 across the surface S. In accordance with this aspect of the invention, the rub block 100 includes a galley or pocket or recess formed in a surface of the rub block 100 against which the felt web 12 is pressed. The galley provides a volume in which the pressurized liquid material collects or puddles adjacent the felt web 12. This puddle may improve the flow of the liquid material through the felt 12 onto the receiving surface S to produce a more consistent application of the liquid to the surface. The features of the rub block as to flow to the felt through the galley and orifice may be the same as described in the Wright et al patent and reference may be made to that patent for further description.

The mounting arm 40 is provided with a transverse pivot pin 102 for each rub block. The rub block 100 includes a blind hole 104 that receives the pivot pin 102. The pivot pin 102 is generally aligned along the Y axis. The pivot pin 102 inherently prevents any pivoting motion about the X axis and the Z axis. The degree of pivoting about the Y axis is determined by another pin 106. This pin 106 is received in a recess or slot 108 that is larger than the pin 106, so that the pin has some freedom of movement within the slot as the rub block 100 articulates about the Y axis. The slot 108 size may be determined for the desired amount of pivoting movement of the rub block 100. The pins 102 and 106 may be single pins that extend through the plate 40 to support each rub block, or may be separate pins. The rub blocks 100 may be retained on the pivot pins 102 by a set pin or screw 110.

A felt retainer 120 may also be optionally provided. The retainer 120 is realized in the form of a plate 122 that carries two retaining pins 124. The retaining pins extend laterally from the plate 122 and help maintain the felt positioned on the rub block 100, as illustrated in FIG. 6. The plate 122 is installed on the extension 42 with a pivot pin 126. When it is desired to remove or install felt onto the rub block, the plate 122 can be simply swung away to remove the pins 124 from obstructing installation of the felt onto the rub block (shown in the up position in phantom, FIG. 5). The plate 122 may be retained in its up and down positions by suitable detents, latches or other devices if so desired.

It should further be noted that the dual dispensing head aspect may be utilized in a dispensing apparatus that is not tilted and without the use of the articulated rub blocks. Such an embodiment is less preferred in that the rub blocks are not as compliant to the receiving surface, however, some of the benefits of the dual dispensing head arrangement are still realized.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

Having thus described the invention, I claim:

1. Fluid dispensing apparatus, comprising:
   a positive displacement pump having an inlet connectable to a supply of fluid to be dispensed and an outlet, said positive displacement pump comprising a piston pump with a metering volume defined by a piston chamber of said pump;
   a dispensing head having a flow path in fluid communication with said pump outlet,
   a porous web of material through which the fluid is applied to a surface;
   said dispensing head supporting said porous web of material;
   said flow path being unobstructed from said pump outlet to said porous web without a valve in said flow path, wherein said dispensing head pivots about a first axis and comprises means to restrict pivoting about another axis.

2. The apparatus of claim 1 wherein said means to restrict pivoting comprises a pivot pin and associated groove arrangement inside said dispensing head.

3. The apparatus of claim 1 comprising an accumulator in fluid communication with fluid from said pump outlet.

4. The apparatus of claim 1 comprising a pressure sensor that detects pressure of fluid into said pump.

5. The apparatus of claim 1 wherein said dispensing head is supported on a guide mechanism that allows said head to be repositioned for replacing said web of material.

6. The apparatus of claim 1 comprising a drive device for moving said web to expose unused web to fluid being dispensed.

7. The apparatus of claim 1 comprising an air motor operatively coupled to said pump.

8. The apparatus of claim 7 comprising a coupling between said pump and said air motor with said pump and said coupling aligned at an angle that determines flow rate of said pump.

9. The apparatus of claim 7 wherein said air motor comprises a variable speed motor and quantity of fluid dispensed is a function of said air motor speed.

10. The apparatus of claim 9 comprising a speed signal indicative of said air motor speed.

11. The apparatus of claim 9 comprising a pressure regulator that produces a variable output pressure that drives said air motor.

12. The apparatus of claim 11 wherein said variable output pressure is a function of a position signal.

13. The apparatus of claim 11 wherein said pressure regulator produces an output air pressure based on position of a dispensing head relative to the surface on which fluid is being dispensed.

14. The apparatus of claim 13 comprising a signal that corresponds to position of said dispensing head, said pressure regulator producing an output air pressure that is a function of said position signal.

15. The apparatus of claim 14 comprising a control circuit that accesses a dispense rate profile that relates said position signal to output air pressure to said air motor.

16. The apparatus of claim 15 wherein said position profile comprises a software database.

17. The apparatus of claim 16 wherein said database comprises at least one of the following: a) empirical data relating position of a robotic arm and flow rate of material to be dispensed; b) robotic arm position to said positive displacement pump output; and c) position zone of a robotic arm to air motor speed.

18. The apparatus of claim 1 wherein the fluid is a primer and the surface is a windshield.

19. The apparatus of claim 1 comprising two dispensing heads with each dispensing head in fluid communication with a respective positive displacement pump and supply of fluid to be dispensed there through.

20. The apparatus of claim 19 wherein said dispensing heads dispense first and second primers to a flit on a windshield.

21. The apparatus of claim 1 wherein the fluid to be dispensed has a low viscosity and said piston pump controls fluid flow to the porous web.

22. The apparatus of claim 21 wherein the fluid viscosity is less than 100 centipoises.

23. Fluid dispensing apparatus, comprising:
   a positive displacement pump having an inlet connectable to a supply of fluid to be dispensed and an outlet, said positive displacement pump comprising a piston pump with a metering volume defined by a piston chamber of said pump;
   an air motor operatively coupled to said pump; said air motor comprises a variable speed motor and wherein quantity of fluid dispensed is a function of said air motor speed;
   a dispensing head having a flow path in fluid communication with said pump outlet, a porous web of material through which the fluid is applied to a surface;

said dispensing head supporting said porous web of material;

said flow path being unobstructed from said pump outlet to said porous web without a valve in said flow path.

* * * * *